United States Patent
Theysohn et al.

[11] 4,025,022
[45] May 24, 1977

[54] DIE MOLD

[75] Inventors: Friedrich Theysohn, Hannover; Horst Gienapp, Langenhagen; Horst Lange, Eilveste, all of Germany

[73] Assignee: The Firm Friedrich Theysohn, Hannover, Germany

[22] Filed: June 20, 1975

[21] Appl. No.: 588,820

[30] Foreign Application Priority Data
Aug. 27, 1974 Germany .............. 2440900

[52] U.S. Cl. .................. 249/63; 249/162; 425/438

[51] Int. Cl.[2] .......... B41B 11/52; B29C 1/14; B28B 7/10

[58] Field of Search .......... 249/149, 151, 124, 125, 249/162, 180, 63, 64; 425/346, 412, 436 R, 438, 441

[56] References Cited
UNITED STATES PATENTS

| | | | |
|---|---|---|---|
| 2,521,520 | 9/1950 | Jancura | 249/63 X |
| 3,152,365 | 10/1964 | Fisher | 249/64 X |
| 3,373,460 | 3/1968 | Ladney | 249/63 X |
| 3,433,292 | 3/1969 | McDonald | 249/64 X |
| 3,473,197 | 10/1969 | Wilds | 425/438 X |
| 3,509,603 | 5/1970 | Halsall | 249/64 X |
| 3,865,529 | 2/1975 | Guzzo | 249/180 X |
| 3,905,740 | 9/1975 | Lovejoy | 249/63 X |

*Primary Examiner*—Ronald J. Shore
*Assistant Examiner*—John S. Brown
*Attorney, Agent, or Firm*—Dressler, Goldsmith, Clement, Gordon & Shore, Ltd.

[57] ABSTRACT

A die mold is disclosed for the manufacture of crate like containers having lateral walls at least the upper portion of which are double-walled to provide substantial stability to the container and strength to the container walls. The die mold includes a base plate, lateral wedges which move upwardly and downwardly at an angle to the vertical during opening and closing of the mold, and slider means which are positioned on the lateral wedges and are movable with respect to the lateral wedges in a reciprocal direction relative to the walls of the containers formed by the die mold. Holding means is provided for holding the slider means in the same position relative to the container during mold opening, and control means are provided to permit the slider means to move back from the container walls after the container has been moved a predetermined distance away from the base plate.

9 Claims, 4 Drawing Figures

DIE MOLD

BACKGROUND OF THE INVENTION

The present invention pertains to a die mold for the manufacture of crate like containers, particularly of bottle transport crates, which mold includes a generally rectangular base plate with cores jutting up at the corners, an inner core which can be moved back and forth in relation to the base plate, and four lateral wedges which can be moved back and forth at a relatively sharp angle to the vertical when the mold is closed and opened.

In using modern storage and transport procedures, increasingly higher requirements have been placed on the stability and load capacity of bottle crates in recent years. In the construction of crates, the basic guiding principle must be that in stacking several pallets on top of one another, a load of up to 1,000 kg. may be exerted on the bottom crates. This necessitates a corresponding stability of the lateral walls of the crates. On the other hand, the actual weight of such synthetic crates must not be too great, since otherwise the material requirements would be excessive, and the manufacturing costs would increase beyond proper proportion.

In the known types of synthetic bottle crates, indentations are provided, as a rule, in the lateral walls in such a manner that on the top end there appears a wall section which can be simultaneously used as a grasping handle. Serrations running vertical to the lateral walls are provided in the lateral walls for reinforcement. The manufacture of these serrations does not provide any difficulty.

For the further increase of load capacity, bottle crates have been developed in which the corners are formed from a hollow profile. In this fashion, however, only a partial improvement in stability is produced, because the wall areas existing between the corners constitute a simple profile, as before. In order to manufacture crates of this type, die molds are used which contain a base plate on whose corners cores constituting the hollow profile jut up. The lateral edging of the mold is formed by means of four lateral wedges which are provided with projecting pieces which extend toward the interior and which serve to produce the indentations or cut-outs in the lateral walls. Into the outer mold there juts from the top a core which has on its bottom side projections and grooves, which, in accordance with the specific structure of the base plate, produce a corresponding formation of the crate base, which is, for the most part, intermittent in structure. In constructing die molds of this type, measures must be provided which permit a damage proof and substantially automatic removal of the crates from the molding implement. In order to open the mold following termination of the mold injection procedure, the inner core of the mold is moved away from the base plate, whereby the finally processed crate remains on the inner core. Synchronously, the lateral wedges are opened by being moved outwardly at a sharp angle to the base plate on the inner inclinations of supporting wedges. During this joint movement of the lateral wedges and the core, the lateral wedges, including the projections provided at the ends of the lateral wedges, are moved outwardly so that when the lifting motion of the lateral wedges is terminated, the container can be removed from the core by a stripping device without any interference.

SUMMARY OF THE INVENTION

The purpose of the present invention is to perfect a die mold of the aforementioned type in such a manner that the stability of the lateral walls of a molded container is increased without notably increasing manufacturing costs and material consumption.

For the manufacture of double walled sections the present invention contemplates providing sliders on the lateral wedges next to openings in the container sidewalls that are reciprocally movable toward and away from the container walls, providing positioning means for keeping the sliders in the same position relative to the container during the opening motion of the lateral wedges when the mold is opened and providing control means which permit the sliders to move back from the walls of the container only after the container has been lifted a predetermined distance away from the base plate. Preferably, also provided are sliders for the manufacture of an upper double walled section of the container, a double walled reinforcement serration in the midportion of the lateral walls, and cores jutting from the base plate for the production of a lower double walled section of the lateral walls of the molded container.

In accordance with the present invention, the lateral walls can, on the one hand, be provided with notches or indentations which are desired for material saving reasons as well as for aesthetic reasons; however, on the other hand, the lateral walls can also be constructed in their entirety with double walls so that the stability of the crate in relation to forces acting in the plane of the lateral areas is considerably increased. A reinforcement serration can be provided in the midportion of the lateral walls, although this is not absolutely necessary. The mold parts filling the space between the inner walls of the double walled sections of the container sidewalls preferably are subdivided or split-up in segment like fashion on the slider and the base plate. In this fashion, stability can be further increased without additional difficulties appearing during the mold opening procedure.

The sliders during the mold opening procedure execute a spatial movement which is controlled so that they remain in the manufactured container until the mold parts forming the notches in the lateral walls are released. Only then follows a relative movement in the plane of the lateral walls of the container between the sliders and lateral walls. The movement of the sliders away from the lateral walls is delayed until the sliders can execute this movement without any interference. Thus, for the first time, it is possible to construct the walls of containers of the aforementioned type in hollow wall fashion on all sides is produced which is essentially more stable in form and has a greater load capacity than the heretofore known types. By means of the hollow profile, which is subdivided in segment like fashion, greater wall stiffness can be achieved than with the known massive lateral walls which are reinforced with exterior cross pieces. Thus, the total amount of material can be decreased so that the transport containers made according to the present invention can be constructed lighter but equally stable. It is a further advantage that due to the reduced amount of material employed, the injection cycle can be shortened so that a larger number of containers can be produced henceforth within the same manufacturing time period.

DETAILED DESCRIPTION OF THE PREFERRED EMBODIMENT

Figure 1:
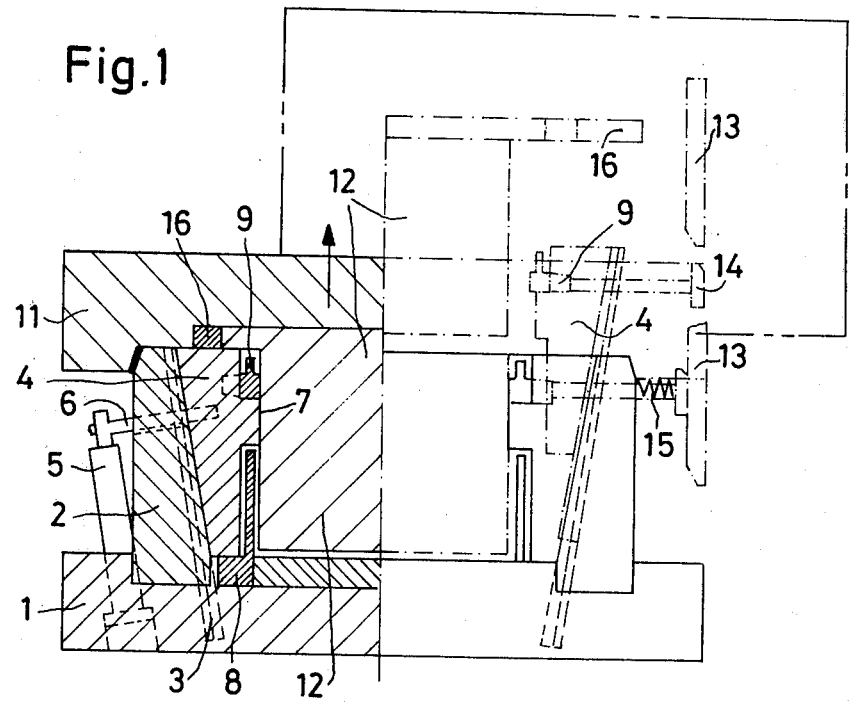
FIG. 1 shows a die mold according to the present invention, partly in section and having a base plate and an inner core; the sectioned portion showing the mold in a casting position and the unsectioned portion showing the mold in an open position.
Figure 2:
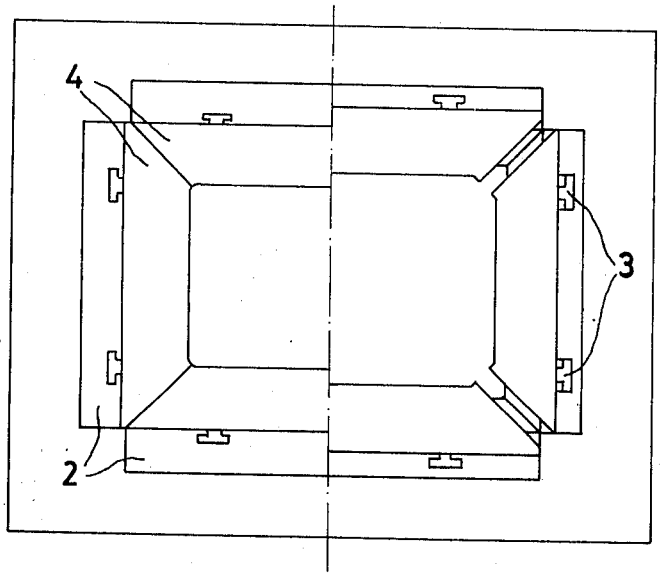
FIG. 2 is a partial top view of the die mold shown in FIG. 1 illustrating the position of lateral wedges when the mold is closed and open.

The die mold according to FIGS. 1 and 2 comprises base plate 1 onto which for supporting flanges 2 are securely fastened. Guides 3 are provided on the supporting flanges 2 into which are slidably positioned movable lateral wedges 4. Guides 3 are situated at a sharp angle to the vertical, and the contact surfaces of lateral wedges 4 having a corresponding inclination which is only slightly different from the inclination of the guides 3. This prevents the movable wedges 4 from sliding along the entire surface during a sliding movement and from establishing contact with the guides 3 only in their terminal position.

Lateral wedges 4 are driven by means of hydraulic motor means such as cylinder 5 which is arranged substantially parallel to slanting guide 3 and is coupled by means of connecting bolt 6 to inner lateral wedge 4.

Each of lateral wedges 4 is provided with a projection 7 extending into the mold cavity which serves to create a recess in the respective lateral wall of the container. From base plate 1 four central cores 8 jut or extend between the corners of the mold cavity. These cores, which can also be composed of several individual cores, are secured to the base plate and serve to form the bottom hollow wall section running up to the notch or identation in the lateral wall of the container. Each projection 7 has an upper face upon which rests a slider 9 which serves to form the hollow wall profile above the projection 7.

The further part of the mold, independent of the bottom base plate 1, includes top base plate 11 and massive inner core 12 secured thereto and which extends into the hollow area defined by lateral wedges 4. Core 12 has projections on its under side as well as grooves which, in connection with a corresponding profiling of the bottom base plate 1, form an interrupted structure in the crate bottom or base. In some cases, the core may have a further system extending into its interior part from rectangularly crossing recesses in order to provide compartments or receptacles in the bottom section of the container for the diameter of the bottles to be transported.

The sectioned half of FIG. 1 shows the die mold in closed, i.e. casting position. The hollow areas remaining between the inner core 12 and the lateral wedges 4 are filled with material during the mold injection procedure. Following solidification, which is accelerated by cooling conduits in the mold and sliders 9, there begins the mold opening procedure which necessitates a coordination of the movement of the lateral wedges and the inner core. By means of a control system not shown in the drawings, lateral wedges 4 are lifted in synchronism with slanting guides 3 by means of hydraulic cylinders 5, while the inner core 12 is moved upwardly together with the container surrounding it. In the end-position, illustrated on the unsectioned side of FIG. 1, lateral wedges 4 are at such a distance from the finished container that projections 7 on lateral wedges 4, and which serve to form recesses or cut-outs, in the lateral walls of the container, are completely pulled back from the lateral walls of the container.

Sliders 9 for forming hollow areas above the recesses are horizontally and movably positioned in lateral wedges 4. While sliders 9 are normally released prior to mold opening, in this case it is not possible. Rather sliders 9 remain in the hollow walls of te container during the initial phase of the mold opening procedure, i.e., they are elevated together with lateral wedges 4 and, due to the sloping motion of lateral wedges 4, sliders 9 execute a movement relative thereto. As soon as lateral wedges 4 have attained their uppermost position, sliders 9 also remain stationary. However, inasmuch as inner core 12 is further moved upwardly together with the container around it, sliders 9 move from the formed hollow wall profiles into free grooves or notches in the container sidewalls and are free to be moved away from the walls of the container in an outwardly direction.

For controlling the movement of sliders 9 in the horizontal direction, a cam control means is provided which is coupled to the the inner of theinner core 12.

When the mold is closed, sliders 9 are pressed by a cam 13 through compression plate 14 on slider 9 against the urging of spring 15 in an inwardly direction. During the mold opening procedure, however, cam 13 passes compression plate 14 simultaneously with the motion of inner core 12. The length of the cam 13 is dimensioned so that following the backward motion of the sliders 9 away from the container wall the free end of cam 13 is removed from compression plate 14 and thus releases slider 9 for movement in the outwardly direction. This movement is caused by the force of spring 15. Henceforth, the mold is in condition so that the container can be removed. During further opening of the mold, the top edge of the processed container strikes against a stripping device 16 which releases the container from the inner core 12. The finished product can then be removed from the casting machine by means of suitable removing devices.

Figure 3:
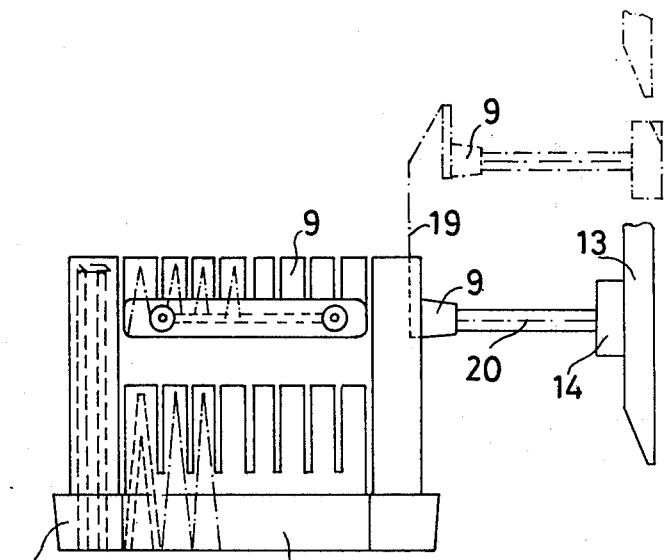
FIG. 3 shows a side elevational view of the mold base plate provided with a slide which can be moved laterally outwardly.
Figure 4:
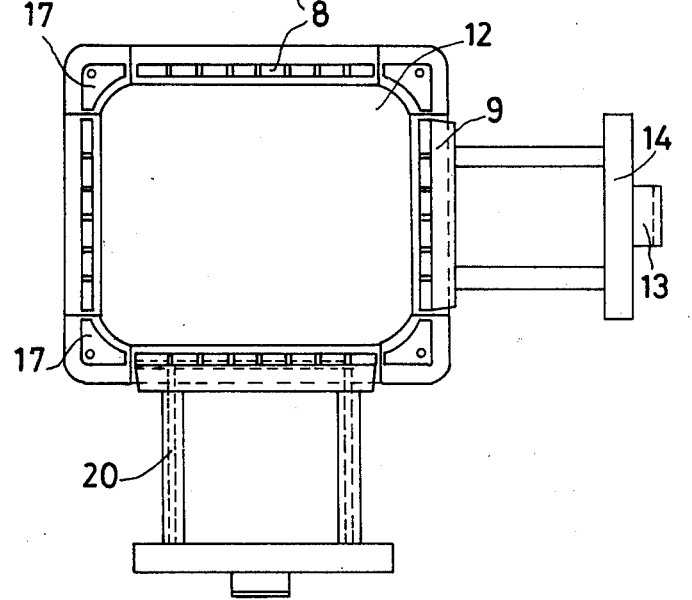
FIG. 4 is a top view of the mold base plate shown in FIG. 3.

FIG. 3 shows the arrangement of the various core elements which serve in the construction of the hollow wall sections. In each of the corners of the bottom base plate is provided corner core 17 for forming the hollow corners. Between corner cores 17 there are provided central cores 8 for the production of the lower hollow wall segment of the lateral walls, which cores 8 jut or extend upwardly from the base plate. Cores 8 are subdivided in segment-like fashion by vertical notches and in this manner provide a corresponding subdivision of the inner walls of the hollow profile of the double-walled container having increased solidity is thereby created. While this lower hollow wall section could have been provided hitherto without any difficulties, it alone does not result in a notable increase in the load capacity of the lateral walls. This increase manifests itself in connection with the upper and/or middle hollow wall sections, because, notwithstanding the identation in the lateral walls, the entire height of the container is thus constructed in double wall fashion and, accordingly, gives rise to the sudden increase in stability under loads in the direction of the plane of the lateral walls. The sliders 9 for the production of the upper hollow wall sections also have spaced vertical notches at predetermined distances from one another which produce a segment-like subdivision of the hollow profile.

FIG. 3 again shows the control for slider 9. When the mold is closed, the slider 9 is positioned within the mold cavity. Cam 13 bears against compression plate 14 and is coupled to inner core 12, and slider 9 is brought into position by means of compression plate 14. In opening the mold, inner core 12 is pulled out and cam 13 simultaneously moves upwardly. Slider 9, on the other hand, moves along line 19 while still in the molded container.

In instances where additional support is to be provided inside of the indentation of the lateral walls of the container, a second group of valves or sliders may be provided which are controlled in the same fashion as sliders 9 and facilitate the construction of the support as a hollow profile.

In order to regulate the horizontal movement of sliders 9, hydraulic regulation which follows the movement of inner core 12 can be used instead of the shown mechanical regulation. In order to guarantee a regulated movement of the movable mold parts, means such as switches are provided for the end positions of the sliders 9, which immediately interrupt the total operational cycle of the machine and thus obviate the possibility of damage to the mold parts in the event that the sliders do not completely move back. For the cooling of the sliders, the segments thereof are provided with bores through which a cooling fluid is introduced. The connection of the segments with the total cooling system of the machine is effected through bores in slider shafts 20.

While this invention is susceptible of embodiment in many different forms, there has been shown in the drawings and has been described in detail one specific embodiment, with the understanding that the present disclosure is to be considered as an exemplification of the principles of the invention and is not intended to limit the invention to the embodiment illustrated.

What is claimed is:

1. A die mold for the manufacture of crate like containers having lateral walls at least the upper portion of which are double walled, comprising:
    a generally rectangular base plate having corner cores jutting up at the corners of the base plate;
    an inner core positioned above the base plate and movable toward and away from the base plate;
    four lateral wedges which are movable upwardly and downwardly at a sharp angle to the vertical during opening and closing of the mold;
    slider means positioned on said lateral wedges and movable with respect thereto and in a reciprocal direction relative to the walls of said containers;
    cam control means for holding said slider means in the same position relative to said container during mold opening while said lateral wedges move upwardly and providing a backward movement of said slider means from said container walls after said container has been lifted a predetermined distance away from the base plate.

2. A die mold according to claim 1 wherein said cam control means includes a cam means, a pressure plate connected to said slider means and adapted to coact with said cam means, and a spring, said spring urging said slider means away from the container and toward said cam means.

3. A die mold according to claim 2 wherein said cam means includes a cam connected to said inner core and permitting a backward movement of said sliders, said cam being dimensioned lengthwise so as to release said sliders for motion away from said container walls when said container has been lifted a predetermined distance from said base plate.

4. A die mold according to claim 1 wherein each of said wedges is provided with a projection extending into a mold cavity defined by said wedges and said base plate and wherein said slider means are positioned above said projections for the production of said upper, double walled portion of said container.

5. A die mold according to claim 4 wherein said sliders are provided in the middle region of the lateral walls.

6. A die mold according to claim 1 wherein a plurality of central cores is provided jutting from the base plate and secured thereto to provide for the production of said lateral walls having a lower double walled portion.

7. A die mold according to claim 1 wherein said sliders have a plurality of spaced notches at a predetermined distance from one another to produce segment-like subdivisions in the hollow lateral walls to increase the rigidity of said walls.

8. A die mold according to claim 6 wherein said central cores have a plurality of spaced notches at a predetermined distance from one another to produce segment-like subdivisions in the hollow lateral walls to increase the rigidity of said walls.

9. A die mold according to claim 1 wherein said cam control means for holding said sliders and providing a backward movement of said sliders are actuated by a hydraulic motor means.

* * * * *